United States Patent
Kim et al.

[11] Patent Number: 6,123,747
[45] Date of Patent: Sep. 26, 2000

[54] APPARATUS AND METHOD FOR MANUFACTURING BARNYARD MANURE USING SEWAGE AND SLUDGE

[75] Inventors: Dong Wook Kim, Seoul; Jae Kyung Jo, Sungnam; No Hyuk Kwak, Suwon; Jae Gun Bae, Seoul; Chung Hwan Oh, Seoul; Youn Gun Chin, Taegu; Yong Sik Lee, Seoul, all of Rep. of Korea

[73] Assignee: Hyundai Engineering Co., Ltd., Seoul, Rep. of Korea

[21] Appl. No.: 09/170,125

[22] Filed: Oct. 13, 1998

[30] Foreign Application Priority Data

Oct. 13, 1997 [KR] Rep. of Korea ............... 97-53177

[51] Int. Cl.$^7$ .................. C05F 11/08; C05F 3/00; B09B 3/00; B01D 50/00; B01F 15/00
[52] U.S. Cl. .................. 71/8; 71/9; 71/12; 71/15; 422/184.1; 422/171; 366/138; 366/186; 210/178; 435/290.1; 435/290.2; 435/290.3; 435/290.4; 435/294.1; 435/819
[58] Field of Search ............... 435/290.1, 290.2, 435/290.3, 290.4, 294.1, 819; 71/8, 9, 12, 15; 422/184.1, 171; 366/138, 186; 210/178

[56] References Cited

U.S. PATENT DOCUMENTS

| | | | |
|---|---|---|---|
| 2,474,833 | 7/1949 | Eweson | 71/9 |
| 2,639,902 | 5/1953 | Kuebler | 71/9 |
| 2,734,803 | 2/1956 | Ruskin | 71/9 |
| 2,788,960 | 4/1957 | Skinner et al. | 71/9 |
| 2,929,688 | 3/1960 | Riker et al. | 71/9 |
| 3,419,377 | 12/1968 | Redman | 71/9 |
| 3,837,810 | 9/1974 | Richards et al. | 71/9 |
| 5,693,528 | 12/1997 | Grabbe et al. | 435/286.6 |

FOREIGN PATENT DOCUMENTS

| | | | |
|---|---|---|---|
| 2315705 | 10/1974 | Germany | 71/9 |
| 10-0203924 | 3/1999 | Rep. of Korea . | |

OTHER PUBLICATIONS

Perry's Chemical Engineer's Handbook, Solid–Solid Operations and Equipment, p. 19:12–19:14, 1997.

*Primary Examiner*—Gary P. Straub
*Assistant Examiner*—Melanie C. Wong
*Attorney, Agent, or Firm*—Birch, Stewart, Kolasch & Birch, LLP

[57] ABSTRACT

An apparatus and method for manufacturing barnyard manure using sewage and night-soil sludge for use in farmlands and flower gardens so as to prevent secondary contamination of the environment quickly, at a low cost, and with high efficiency.

10 Claims, 4 Drawing Sheets

APPARATUS AND METHOD FOR MANUFACTURING BARNYARD MANURE USING SEWAGE AND SLUDGE

BACKGROUND OF THE INVENTION

1. Field of the Invention

The present invention relates to an apparatus and method for manufacturing organic barnyard manure useful for farmlands and flower gardens using sewage and septic or night-soil sludge. More particularly, to an apparatus and method for manufacturing organic barnyard manure for preventing secondary contamination of the environment which is quick, inexpensive, and highly efficient.

2. Description of the Related Art

Various types of apparatus and methods for manufacturing barnyard manure using sewage and sludge are known in the art. A great quantity of sludge is produced at sewage disposal plants or night-soil treatment plants. This sewage and sludge must be buried underground because of the odor emitted and to prevent harmful insects from swarming around and causing an unhygienic environment.

Burial grounds or dumps for common waste should be used for burying the sewage and night-soil sludge. However, burial grounds are very insufficient. Also secondary contamination of the environment and the water supply may result.

Accordingly, various other methods for treatment of sewage and septic or night-soil sludge other than burying have been studied. Furthermore, various types of apparatus for treatment of sludge have been developed. However, such apparatus require repeated treatment and are expensive to establish, maintain and manage.

In order to avoid such problems, an apparatus for manufacturing organic barnyard manure using sewage and night-soil sludge, had been developed by the present Inventors and filed as Korean Patent Application Serial No. 96-69398, which discloses that sewage and night-soil sludge be dried in a drying chamber and fermented in a fermentation chamber to manufacture organic barnyard manure.

However, in the above apparatus, the multistage fermentation chambers are driven by a single chain and a single motor, to transfer semi-fermented sludge from one fermentation chamber to another. Furthermore, an exhaust hole of the one fermentation chamber and an inhalation hole of the fermentation chamber should be stopped to correspond with each other. However, it is difficult to correspond them. Also, since the drying chamber is established at a location above the fermentation chamber, it is difficult to provide the semi-fermented sludge accurately within the drying chamber.

In addition, since the odor generated from the drying chamber and the fermentation chamber is exhausted into the air, secondary contamination of the environment may be generated.

SUMMARY OF THE INVENTION

Accordingly, it is an object of the present invention to provide an apparatus and method for manufacturing barnyard manure using sewage and sludge, which eliminates the above problems encountered with conventional apparatus and methods for manufacturing manure using sewage and sludge.

Another object of the present invention is to provide an apparatus for manufacturing organic barnyard manure using sewage and night-soil sludge which includes a drying chamber located below a fermentation chamber. Sewage or semi-dried night-soil sludge exhausted from the drying chamber may be transferred into the fermentation chamber by a motor and a screw. Furthermore, sewage or night-soil sludge in the fermentation chamber which is over a definite quantity can be discharged beyond the fermentation chamber. In addition, a mixture of gas and steam generated in the drying chamber is passed through a condensation water tank. The steam is condensed into the water and discharged to the exhaust hole. The gas is then returned to the drying chamber together with fresh air. Finally, the gas and steam from the fermentation chamber is passed through an air homogenizer and a biological deodorization tower and is discharged into the air.

A further object of the present invention is to provide an apparatus having a reduced treatment time and reduced cost of manufacture. In addition, it is an object of the present invention to provide an apparatus and method which requires less space for establishment, lower cost for establishment, maintenance and management, and wherein secondary contamination of the environment from emission of gas is prevented.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
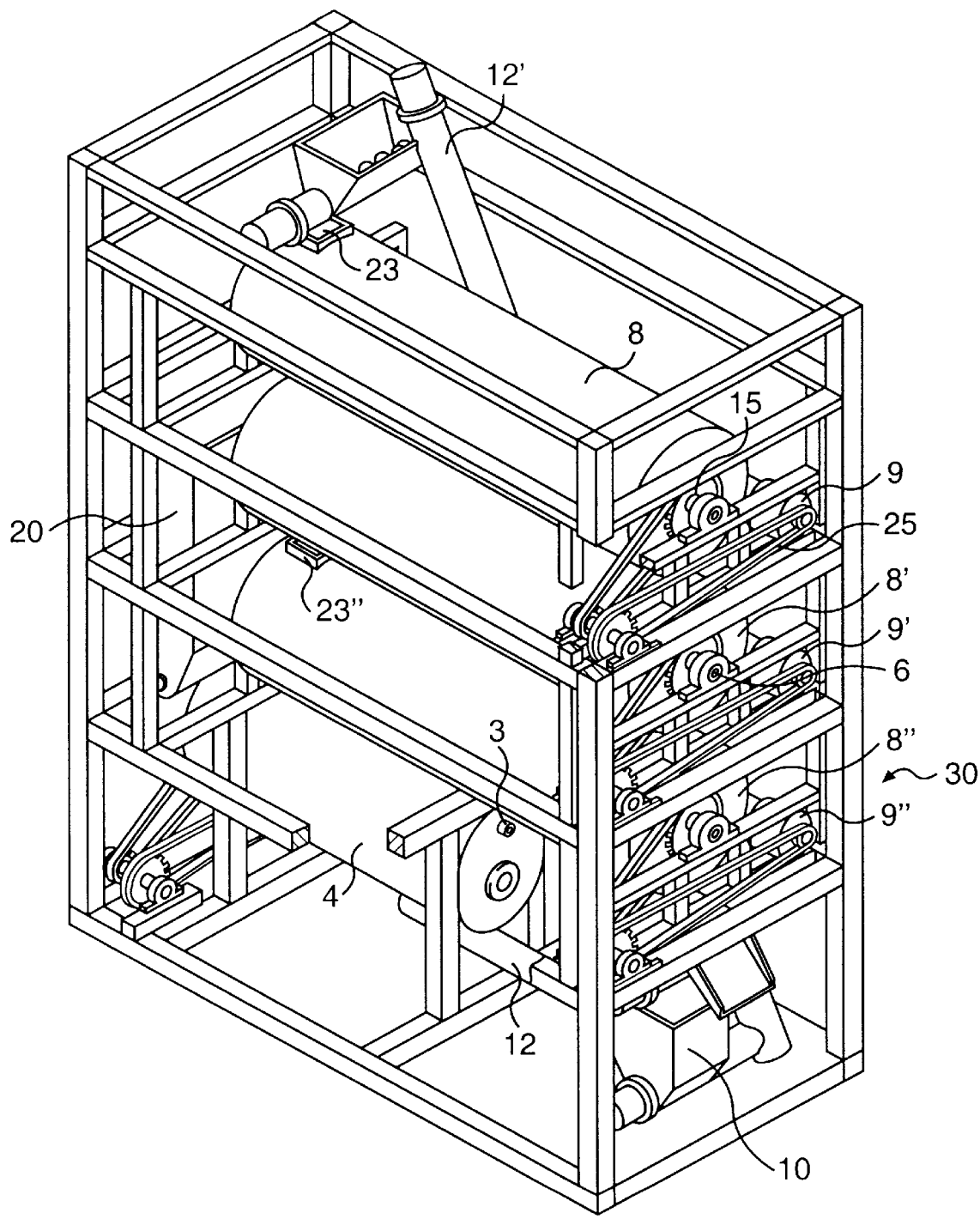
FIG. 1 is a perspective view of an apparatus for manufacturing barnyard manure using sewage and sludge in accordance with the present invention.

Referring now in detail to the drawings for the purpose of illustrating preferred embodiments of the present invention, the apparatus for manufacturing barnyard manure using sewage and sludge will be described with reference to FIGS. 1–4. A housing 30 contains a rotatable cylindrical drying chamber 4 for drying the night-soil sludge. An agitating screw 31 is located within the drying chamber 4 and is driven by a motor 1. An inhalation hole 2 for supplying dry fresh air and a discharging hole 3 for discharging wet or moist air heated by a heater 32 are formed in the housing 30. Furthermore, first, second, and third multistage rotatatable fermentation chambers 8, 8', and 8" for fermenting the sludge by revolving about their own axes include a plurality of slant wings or baffles 5 on an inner surface thereof to mix the sludge. The first fermentation chamber 8 contains a first inlet 6 for supplying fresh air and a first outlet 7 for discharging moist air,.

Figure 5:
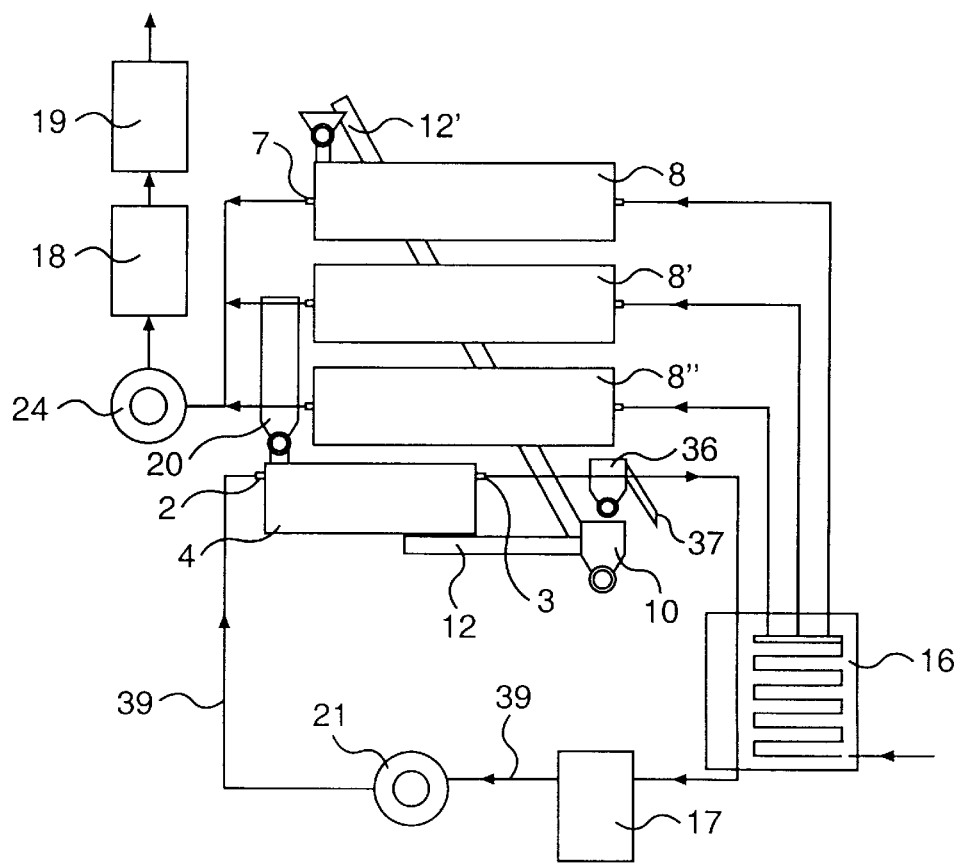
FIG. 5 is a circulating system diagram of the discharging gas in the apparatus in accordance with the present invention.

On upper support parts 38, 38', and 38" above the drying chamber 4, the multistage fermentation chambers 8, 8', and 8" are driven by motors 9, 9', and 9", respectively. A mixer 10 mixes semi-dry sludge discharged from a discharging hole 11 of the drying chamber 4 and transferred by a transferring screw 12 and barnyard manure discharged from the third and lowest fermentation chamber 8". An upward transferring screw 12' located between the mixer 10 and the first uppermost fermentation chamber 8, transfers the mixture of semi-dry sludge and barnyard manure mixed in the mixer 10 to the first uppermost fermentation chamber 8. Barriers 14 for controlling overflow when the amount of semi-fermented sludge reaches a predetermined height are located on a fixed axis 15 toward discharging openings 13, 13', and 13" on the inner side of each of the fermentation chambers 8, 8', and 8". As shown in FIG. 5, the discharging hole 3 of the drying chamber 4 is connected by a connecting hose 39 with a heat exchanger 16 for cooling by any one of air or water. The connecting hose 39 continues on through a condensed water chamber 17 back to the inhalation hole 2 to recover and recycle only dried inner air produced by eliminating moisture from the hot and humid discharged air from the discharging hole 3, without a supply of fresh air. The first outlets 7, 7', and 7" of the fermentation chambers 8, 8', and 8" are connected with an air homogenizer 18 and a biological deodorization tower 19, to deodorize air discharging from the outlets 7, 7', and 7" and then to discharge it. The inlets 6, 6', and 6" of the fermentation chambers 8, 8', and 8" are connected with the heat exchanger 16 for cooling selectively by any one of air or water to supply fresh air. Reference numeral 20 is a supply hopper, 21 and 24 are first and second sucking members, and 22, 23, 23', and 23" are supply holes.

Figure 2:
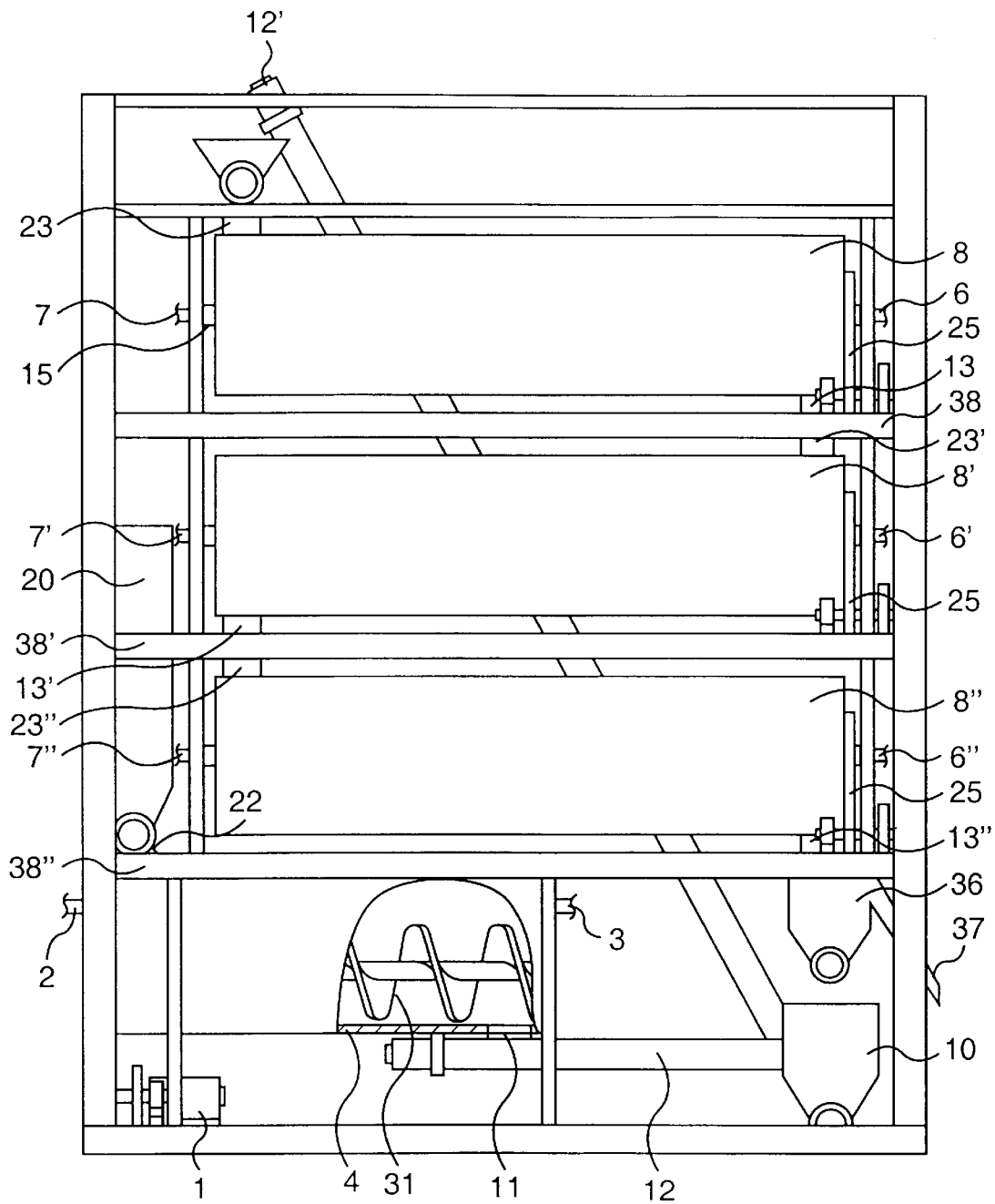
FIG. 2 is a front view of the apparatus in accordance with the present invention.
Figure 3:
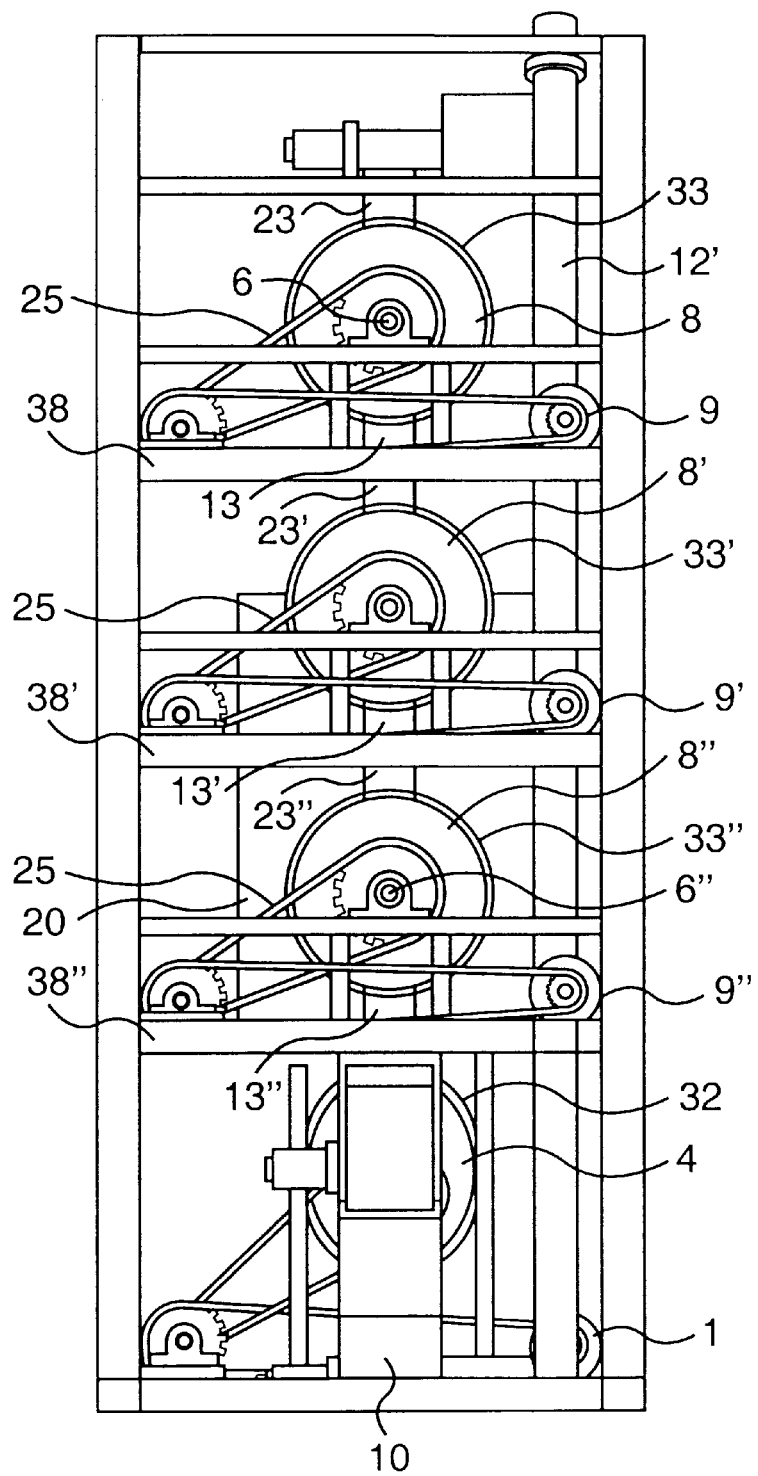
FIG. 3 is a side view of the apparatus in accordance with the present invention.

Referring to FIG. 5, the apparatus for barnyard manure using sewage and sludge according to the present invention operates as follows:

First of all, a certain amount of fermented barnyard manure for supply microorganisms is filled in the mixer 10. The sewage or night-soil or septic sludge is filled in the drying chamber 4 through the supply hopper 20 by operating a control panel (not shown) located on the apparatus of the present invention. The fermentation chambers 8, 8', and 8" are turned on their own axes 15, respectively by sets 25. In the drying chamber 4 and the fermentation chambers 8, 8', and 8" inhalation and exhaust of gas are directed through the inhalation hole 2, each of the inlets 6, 6', and 6", the discharging hole 3, and each of the outlets 7, 7', and 7". The moisture content of the sludge filled into the drying chamber 4 is about 75–85%. The sludge within the drying chamber 4 is kept at a temperature of 60° C. by the heater 32 (FIG. 3), and is transferred toward the discharging hole 11 with the agitating screw 31 within the drying chamber 4 (FIG. 2).

Steam and gas generated from the heated drying chamber are forcibly discharged through the discharging hole 3 by means of a sucking member 21. When the discharged steam and gas are passed through the heat exchanger 16 cooling selectively by any one of air or water occurs. The steam is condensed and the resulting condensation water is collected in a condensation water tank 17. The entire amount of the gas is forcibly recovered through the inhalation hole 2 of the drying chamber 4 by means of the sucking member 21. The gas and steam are passed from the discharging hole 3 to the inhalation hole 2 by connecting hose 39.

At this time, the condensation water recovered in the condensation water tank 17 is discharged, according to the indication of a level gauge (not shown), when the tank is filled up to a predetermined level. Since the entire amount of the discharging gas is recovered into the drying chamber 4 without air discharge, secondary contamination of the environment from offensive odors generated during drying may be prevented.

Upon performance of the above-mentioned method, the sludge having a moisture content of 75–85% is dried to a moisture content of about 65%. The resulting dried sludge is discharged through the discharging opening 11. Simultaneously, the raw sludge is provided from the supply hopper 20 through the supply hole 22 of the drying chamber 4.

The discharged semi-dry sludge is transferred toward the mixer 10 by means of the transferring screw 12 to admix with the already supplied barnyard manure. The resulting admixture is transferred again toward the supply hole 23 of the first uppermost fermentation chamber 8 by means of the upward transferring screw 12'. The barnyard manure and the semi-dry sludge are preferably admixed at the ratio of 6:4 to generate microorganisms and to control moisture preferably at a content of about 57%.

Figure 4:
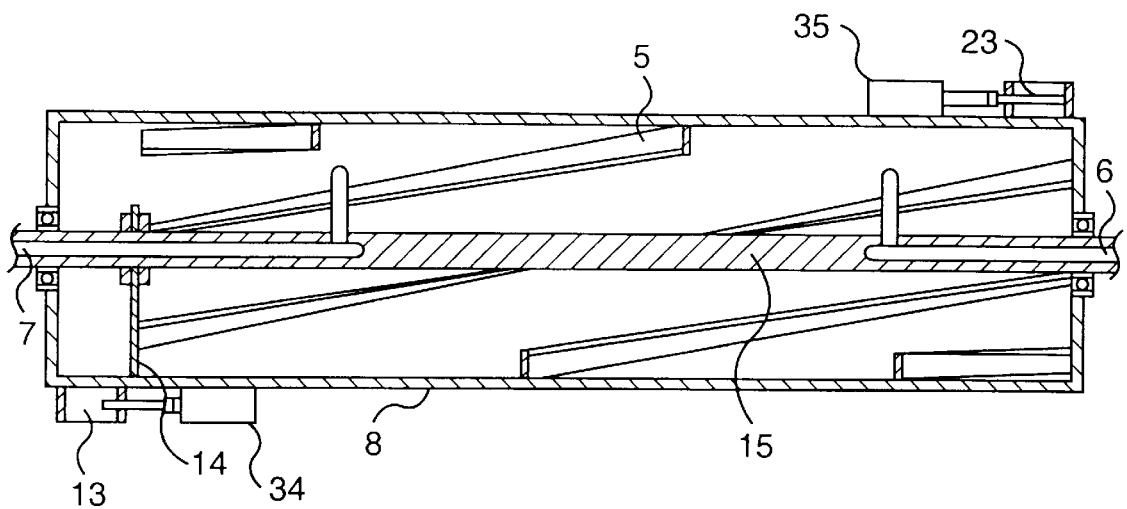
FIG. 4 is a sectional view of the fermentation chamber of the apparatus in accordance with the present invention.

The mixture of the sludge and the barnyard manure provided toward the first supply hole 23 of the first uppermost fermentation chamber 8 from the mixer 10 is fermented to supply new barnyard manure by rotation on the axis 15 of the fermentation chamber 8 and by agitation of the wings 5 therein (FIG. 4).

The sludge fermented within the first uppermost fermentation chamber 8 is supplied through the second supply hole 23' of the second fermentation chamber 8' from the first discharging hole 13 of the first fermentation chamber 8. The sludge fermented within the second fermentation chamber 8' is supplied through the third supply hole 23" of the third lowest fermentation chamber 8" from the second discharging hole 13' of the second fermentation chamber 8'. The fermentation chambers 8, 8', and 8" are stopped by means of a timer and limit switch on the control panel (now shown) when the discharging holes 13, 13', and 13" and the supply holes 23' and 23" are aligned with each other. The doors of the discharging holes 13, 13', and 13" and the supply holes 23' and 23" are operated to open by cylinders 34, 35, respectively (FIG. 4).

The inhalation and exhaust of air are carried out by means of the inlets 6 and the outlet 7 during the course of the fermentation steps, in which the gas generated by fermentation is forcibly discharged through the outlet 7 of the fixed axis 15 by the sucking member 21. The gas is then passed through the air homogenizer 18 and the biological deodorization tower 19 to be deodorized and to discharged. Cool fresh air from the heat exchanger 16 is supplied to the inlet 6 of the fixed axis 15.

Accordingly, since the gas generated by the fermentation is deodorized before being discharged, secondary contamination of the environment by the fermentation gas may be prevented. In the fermentation process a temperature suitable for fermentation of 45–65° C. is kept automatically by means of exothermic action of the microorganisms, in situ. However, when the temperature in the fermentation chambers 8, 8', and 8" is lower than 40° C. on account of the condition of the ambient air, the fermentation temperature should be controlled in a level suitable for fermentation by means of the heaters 33, 33' and 33", respectively. In addition, in the fermentation chambers 8, 8', and 8" a certain quantity of fermented sludge contained microorganisms should be left to promote the fermentation.

Overflow occurs only when the amount of the fermented sludge is greater than the height of the barrier 14. This is achieved since the barrier 14 is constructed having a height of ⅔ of the diameter of the fermentation chambers 8, 8', and 8" on the fixed axis 15 toward the discharging holes 13, 13', and 13". The discharging hole 13" is connected to a chamber 36 having an outlet 37. The moisture content of the barnyard manure manufactured by fermentation in accordance with the present installation is 30–40%. 60% of the manufactured barnyard manure is made into a product and 40% thereof is provided to admix again with the dry sludge. The above-stated process of the present invention is repeated continuously to obtain barnyard manure from sewage and night-soil sludge.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for manufacturing barnyard manure using sewage and sludge, comprising:
    a housing;
    a rotatable, cylindrical drying chamber including:
        an agitating screw driven by a first motor supported on a bottom of said housing;
        an inhalation hole for supplying dry air;
        a discharging hole for discharging wet air; and
        a heater for heating the drying chamber;
    a plurality of rotatable multistage fermentation chambers, each said chamber including:
        a plurality of baffles disposed within the fermentation chambers for mixing the provided sludge by revolving;
        an inlet for supplying fresh air; and
        an outlet for discharging wet air;
    a mixer for mixing the semi-dried sewage and sludge discharged from a discharging opening of said drying chamber with fermented barnyard manure; and
    first and second transferring screws, said first transferring screw for transferring the sludge from the drying chamber to the mixer, said second transferring screw for transferring the mixed sewage and sludge and fermented barnyard manure from the mixer to an uppermost fermentation chamber, wherein the raw sewage and sludge are manufactured into barnyard manure.

2. The apparatus of claim 1, wherein each fermentation chamber includes an inlet for supplying the provided sludge, an outlet for discharging the provided sludge, and a barrier for controlling overflow only when an amount of semi-fermented sludge achieves a certain height.

3. The apparatus of claim 2, wherein there are three of said fermentation chambers, each of the fermentation chambers are arranged one fermentation chamber above another, the inlet of the first, uppermost of the fermentation chambers is for receiving the mixed sewage, sludge and fermented barnyard manure from the second transferring screw, the outlet of said first, uppermost fermentation chamber is arranged to align with the inlet of a second fermentation chamber immediately below the first fermentation chamber to transfer the sewage, sludge and fermented barnyard manure to the second fermentation chamber, the outlet of the second fermentation chamber is arranged to align with the inlet of a third fermentation chamber immediately below the second fermentation chamber to transfer the sewage, sludge and fermented barnyard manure to the third fermentation chamber, and the outlet of the third fermentation chamber is for discharging the manufactured barnyard manure.

4. The apparatus of claim 1, wherein said drying chamber is provided with a heat exchanger connected to the discharging hole by a connecting hose for cooling air exiting therefrom by one of the group consisting of air and water, air is then sent to the inhalation hole through another connecting hose and a condensing water chamber by a first sucking member, the heat exchanger also supplies fresh air to each inlet of the fermentation chambers.

5. The apparatus of claim 1, wherein said plurality of fermentation chambers are provided with a second sucking member for sucking air from each outlet thereof and sending the air to an air homogenizer and a biological deodorization tower in order to deodorize the air.

6. The apparatus of claim 1, further comprising:
    a supply hopper in communication with a supply hole of said drying chamber for supplying raw sewage and sludge to the drying chamber; and
    a plurality of second motors for rotating each of the fermentation chambers, respectively.

7. A method for manufacturing barnyard manure using sewage and sludge, comprising the steps of:
    providing an amount of fermented barnyard manure in a mixer;
    supplying raw sewage and sludge into a drying chamber from a supply hopper;
    agitating the sewage and sludge at a temperature of about 60° C.
    mixing the sludge from the drying chamber with the fermented barnyard manure in the mixer;
    recycling air from a heat exchanger to the drying chamber by a first sucking member;
    transferring the sludge to a plurality of multistage rotary fermentation chambers through an upward transferring screw;
    fermenting and transferring the sludge from an uppermost fermentation chamber to a lowest fermentation chamber by aligning an outlet of the first chamber and an inlet of the second chamber, by operating a timer connected to a motor mounted on each chamber;
    manufacturing a final product in the lowest fermentation chamber; and
    transferring a portion of the final product back to the mixer.

8. The method of claim 7, wherein said drying step changes the moisture content of the sewage and sludge from about 75–85% to about 65%.

9. The method of claim 7, wherein said mixing step provides a ratio of 6:4 of the barnyard manure and dry sludge and a moisture content of about 57%.

10. The method of claim 7, wherein said fermenting step occurs at a temperature of about 45°–65° C., the method further including the step of operating a heater if the temperature drops below 40° C. in order to maintain a temperature between about 45°–65° C.

* * * * *